United States Patent [19]

White et al.

[11] Patent Number: 5,732,467
[45] Date of Patent: Mar. 31, 1998

[54] METHOD OF REPAIRING DIRECTIONALLY SOLIDIFIED AND SINGLE CRYSTAL ALLOY PARTS

[75] Inventors: Raymond Alan White, Schenectady; Yuk-Chiu Lau, Ballston Lake, both of N.Y.

[73] Assignee: General Electric Company, Schenectady, N.Y.

[21] Appl. No.: 748,848

[22] Filed: Nov. 14, 1996

[51] Int. Cl.$^6$ ............................................. B23P 15/00
[52] U.S. Cl. ............................. 29/889.1; 29/889.72
[58] Field of Search ........................ 29/889.1, 889.72, 29/402.09, 402.19; 228/119

[56] References Cited

U.S. PATENT DOCUMENTS

| | | | |
|---|---|---|---|
| 5,009,359 | 4/1991 | Stover et al. | |
| 5,071,054 | 12/1991 | Dzugan et al. | 29/889.1 |
| 5,280,849 | 1/1994 | Galanes | 29/889.1 |
| 5,291,937 | 3/1994 | Corderman et al. | 29/889.1 |
| 5,318,217 | 6/1994 | Stinson et al. | 228/194 |

OTHER PUBLICATIONS

"Gastight Plasma Sprayed Sealings for Hip Diffusion Bonding of Materials" by D. Stover, H.P. Buchkremer, R. Hecker and W. Mallener, Thermal Spray Research and Applications, Proceedings of the Third National Thermal Spray Conf., Long Beach CA, 25 May 1990, pp. 239-243 & Title Page.

*Primary Examiner*—Irene Cuda
*Attorney, Agent, or Firm*—Noreen C. Johnson; Douglas E. Stoner

[57] ABSTRACT

A new method is provided for repairing cracks in the outer surfaces of structural parts being a superalloy article having a directionally oriented microstructure, such as a blading member. The article may have internal passageways communicating through the end of the article. The method coats and seals cracked outer-surface areas of directionally solidified and single crystal structures by coating the defective area using a High Velocity Oxy-Fuel process (herein also referred to as HVOF), followed by hot isostatic pressing the part.

12 Claims, 3 Drawing Sheets

METHOD OF REPAIRING DIRECTIONALLY SOLIDIFIED AND SINGLE CRYSTAL ALLOY PARTS

FIELD OF THE INVENTION

The present invention relates to a method of repairing defects in directionally solidified and single crystal alloy parts. More particularly, the invention is directed to methods for repairing surface cracks in structural alloy parts, such as engines, by cleaning, coating, and hot isostatic pressing the part to provide a leak-free repaired area, while maintaining the crystalline structure and mechanical properties of the alloy part.

BACKGROUND OF THE INVENTION

The reported technology for growing directionally oriented cast structures from superalloys has evolved from processes suitable for making simple shapes and members to processes that are currently used to form articles having complex shapes, such as the directional solidification of nickel-base superalloy blading members used in the hot sections of gas turbine engines. The published literature, such as Metals Handbook Ninth Edition, Vol. 15 Casting, ASM international (1988), pages 319–323, has many examples of processes for making directionally oriented, superalloy blading members, such as turbine blades and vanes. Most of these processes utilize some form of a withdrawal-type vacuum induction casting furnace with mold susceptor heating.

An example of a blading member having a complex shape of the type described above is the turbo machinery blade described in U.S. Pat. No. 4,010,531. Such a blading member comprises an airfoil-shaped outer wall having a complex hollow interior communicating with an end region, such that gases can be circulated from the hollow interior through the outer wall and end region for cooling purposes, wherein the end region comprises a tip that extends from the end of the member.

Airfoil blading members, are frequently utilized in extreme environments where they are exposed to a variety of environmentally related damage and wear mechanisms, including: erosion due to impact by high velocity and high temperature airborne particles, high temperature oxidizing and corrosive gases, low-cycle fatigue processes and mechanical abrasion caused by rubbing against other members. These mechanisms are known to cause cracking and other damage, particularly in the end regions or tips of these members. Because the manufacturing costs for blading members are typically relatively high, it is often desirable to repair them rather than to replace them after the blades have been damaged or worn.

When blading members, or other articles having a directionally oriented microstructure are damaged with a crack, whether in operation or during manufacturing, the problem of repairing the surface crack becomes more complicated and difficult. This problem of repair becomes particularly acute when a directionally oriented microstructure must be maintained in the repaired portion, as is frequently desirable in directionally oriented articles such as airfoils, because of the difficulty of replicating the original directional orientation in the materials used to make the repairs.

One method that has been used for the repair of turbine blades, has been to add material to the damaged or cracked portion by welding, or similar processes. A disadvantage to this method is that the microstructure of the weld is not directionally oriented, and thus the mechanical properties of the repaired area are diminished as compared to the remainder of the directionally oriented microstructure of the article. Also, most current oxidation resistant materials are difficult to weld, and have been known to crack further during the welding process.

Thus, the advanced directional solidified and single crystal alloy engine parts present challenges when they have to be repaired. The main problem that has to be solved is how to preserve the directional solidified and single crystal microstructure in the repaired part. Conventional fusion welding processes would result in a multi-grained, equiaxed cast structure in the repair joints. High temperature brazing would change the chemical composition in the joint, usually by diffusion of boron, and would also produce a cast structure in the joint.

Activated Diffusion Healing (ADH) has been used for conventional superalloy repair. In the case of conventional multi-grained alloys, properties in the repair area are decreased due to boron contamination. The grain structure of the joint would also reduce properties if used to repair directional solidified and single crystal alloys.

A current technique being used to repair superalloy parts is a process known as Partitioned Alloy Component Healing (PACH). This involves blending powders of different compositions, at least one being low melting, such that the overall composition is close to that of the base metal. The part is heated above the melting temperature of the low melting constituent but below the base metal recrystallization temperature, and held at temperature until healed by activated diffusion. The technique reduces, but does not eliminate, boron contamination. Also, the joint is still multi-grained.

In an article entitled, "Gastight Plasma Sprayed Sealings for HIP Diffusion Bonding of Materials", published in the Thermal Spray Research and Applications, Proceedings of the Third National Thermal Spray Conference, Long Beach, Calif., pages 20–25, May 1990, it was suggested that the production of gastight metal coating by low pressure plasma spraying offers the possibility of a new technique for the joining of separate parts by the HIP diffusion bonding process. The reference paper teaches low pressure plasma deposition encapsulation which presents possible limitations on part size, spray gun-to-part surface access, productivity, and cost. This is partly due to the vacuum chamber within which the low pressure plasma deposition spray gun operates.

There is a need for a method of optimum repair of surface cracks in directionally solidified and single crystal superalloy parts. The optimum repair would be one that forces close the cracks, which are open to the outer surface of the part. The process would allow solid state diffusion to heal the cracks at a temperature below the recrystallization temperature of the alloy. There is also a need to maintain the mechanical properties as well as the structural integrity of the directionally solidified and single crystal part so that cracked outer surfaces are sealed for hollow engine parts, such as turbine vanes with multiple cooling holes.

SUMMARY OF THE INVENTION

In carrying out the present invention in preferred forms thereof, a new method is provided for repairing cracks in the outer surfaces of structural parts. The present invention describes methods for repairing cracks in a superalloy article having a directionally oriented microstructure, such as a blading member. The blading members include, for example, turbine blades, buckets, vanes, nozzles, and nonairfoil articles such as turbine shrouds and combustor shingles. The article may have internal passageways communicating through the end of the article. The repair may comprise equiaxed grains, where the directionally oriented crystal structure comprises a plurality of grains or a single crystal.

The invention may be briefly and generally described as a method for repairing cracks on the outer surface of an article, comprising the steps of: selecting an article having a directionally oriented microstructure and a superalloy composition, whereby said article has at least one crack on its outer surface, said crack having an opening to the atmosphere; cleaning said crack surface to sufficiently remove contaminants; coating the cleaned crack surface with a material compatible with a composition of said article; and hot isostatic pressing the coated crack surface at a temperature, pressure, and time sufficient to repair the surface crack. Basically, the invention coats and seals cracked outer-surface areas of directionally solidified and single crystal structures by coating the defective area using a High Velocity Oxy-Fuel process (herein also referred to as HVOF), followed by hot isostatic pressing the part. The result is to diffusion heal the cracks, thereby preserving the unique microstructure with its inherent mechanical property advantages. The technique of coating the surface cracks prior to hot isostatic pressing has general advantages over conventional canning techniques.

An object of this invention is to repair directionally solidified and single crystal surface cracked structures without property losses due to compositional contamination or microstructure changes with respect to the superalloy base material.

BRIEF DESCRIPTION OF THE DRAWINGS

FIG. 1b depicts a cross-sectional view of the cracked surface area shown in FIG. 1a.

DESCRIPTION OF THE INVENTION

The present invention comprises methods to repair cracks and defects on the outer surface of directionally oriented, superalloy articles, through the cleaning, coating and hot isostatic pressing of the superalloy article. The method may be used to repair the crystal structure and overall microstructure of the superalloy article that is compatible with and continuous with that of the article. While potentially useful on a wide variety of articles, the method of this invention is particularly useful in repairing outer surface cracks on an article having a hollow interior and openings or passages communicating with the hollow interior, such as a turbine blade shown in FIG. 1a.

As used herein, the term "crystal structure" is intended to mean the overall crystal morphology, such as a single crystal, multiple elongated grains and other crystal forms, and their orientations. The terms "directionally oriented", "directional orientation" or similar terms refer to strong oriented crystal structures, including directionally solidified polycrystalline and single crystal structures comprising a plurality of elongated grains and single crystals. The desired crystal orientation in nickel-base superalloys frequently used for blading members is that the <001> crystallographic direction be parallel to the length of the member, and thus substantially parallel to the growth direction, in order to minimize the elastic modulus along the length of the member, which also corresponds to the growth direction. The term "High Velocity Oxy-Fuel" (HVOF) is a thermal spray technique for applying coatings that are fully dense having bond strengths greater than about 10,000 pounds per square inch (psi).

Figure 1A:
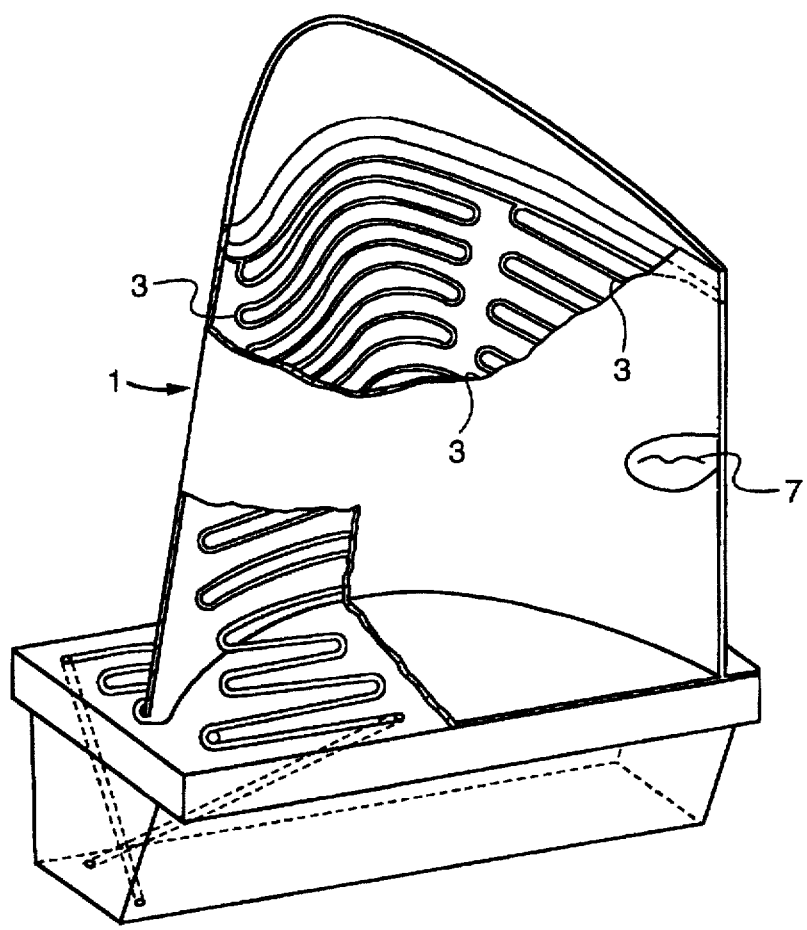
FIG. 1a is a three-dimensional view, partly cut away, showing a typical overall inner and outer arrangement for at least one turbine bucket that is made from a directionally solidified superalloy and that has a crack on the outer surface.

As noted herein, the method is particularly useful for repairing outer surface defects or cracks on an airfoil including an airfoil blading member such as a turbine blade or vane, which is depicted in FIG. 1a. A selected article, such as FIG. 1a, has a superalloy composition and directionally oriented crystal structure. The superalloy may have a superalloy composition of a nickel-base, iron-base, or cobalt-base superalloy, such as is well known and described, for example, in Metals Handbook Tenth Edition, Vol. 1, Properties Selection: Iron, Steel and High-Performance Alloys, ASM International (1990), pages 981–994 and 995–1006, which describes many castable superalloys, and specifically nickel-base superalloys that may be directionally solidified or formed as single crystals. For purposes of this invention, acceptable superalloys would also include high temperature alloys that are not presently in widespread commercial use, such as niobium-base and titanium-base alloys, including niobium-titanium alloys, directionally oriented nickel-base or titanium-base composite alloys and niobium-aluminum alloys.

Turning to FIG. 1a, the blade 1 is shown cut away to demonstrate the internal cooling passages 3 which are surrounded by an outer surface 5. Looking at FIG. 1b, the outer surface 5 is generally a superalloy metal 15 and may have coating overlays, such as a bond coat 11 and a thermal barrier coating 9. The bond coat 11 is any acceptable metallic or ceramic coating that serves to improve adhesion between the subsequent thermal barrier coating 9 and the underlying substrate 15. Examples of bond coats are MCrAlY, where M is nickel, iron, cobalt, or mixtures thereof; and aluminides. The thermal barrier coating 9 provides a protective coating that enables the substrate 15 to operate at higher temperatures. Thermal barrier coatings also protect the underlying parts from corrosive and oxidative environments. An example of a thermal barrier coating is chemically stabilized zirconia, such as yttria stabilized zirconia, where yttria is present in about 1 to 20 weight percent, with the preferred range being about 6–12 weight percent yttria.

During manufacturing or service life, many directionally solidified superalloy parts, such as blades 1, experience cracks 7 and defects in the outer surface 5. It is important to be able to repair the surface cracks 5 without affecting the internal cooling passages 3. It is also beneficial to be able to repair the cracks 7 in directionally solidified or single crystal parts so as to maintain the mechanical and structural properties.

Figure 1B:
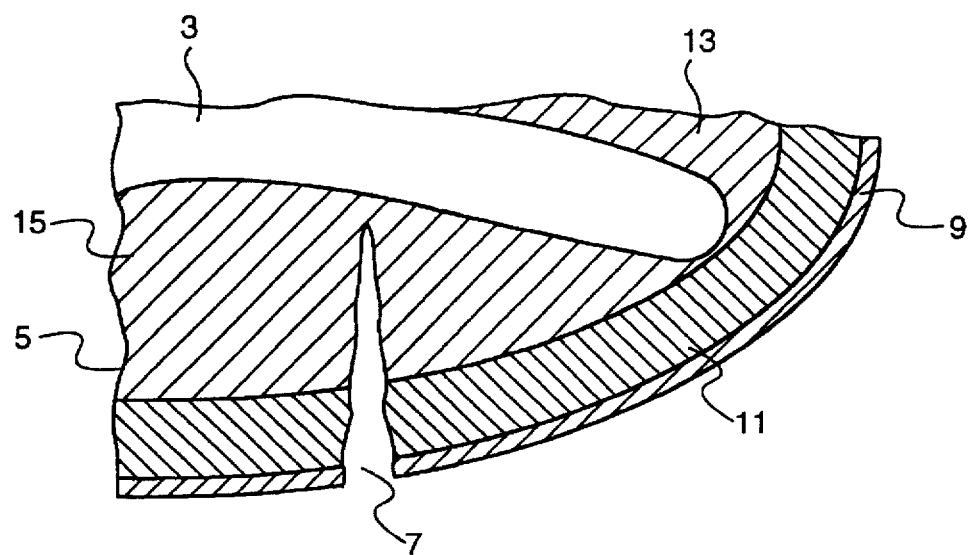

FIG. 1b shows a cross-sectional view of an outer surface area 5 of a blade member having a surface defect or crack 7. The surface defects or cracks often are heavily oxidized areas. It is desirable to remove heavily oxidized contaminants from the surface defects and cracks. The cleaning and surface preparation can be accomplished by methods known in the art such as fluoride ion cleaning, ultrasonic agitated cleaning with or without the use of chemical cleaning compositions. The cleaning method chosen prepares the surface for subsequent coating while not attacking the mechanical properties or the crystal orientation of the part.

After cleaning and surface preparation, cracks with openings in the outermost surface are coated by Hyper Velocity Oxy-Fuel or other thermal spray process, such as low pressure plasma deposition, to seal the crack region. The preferred method of coating is the Hyper Velocity Oxy-Fuel process. The low pressure plasma deposition process, being chamber contained and therefore more costly and limiting, would be used only if the reduced atmosphere from the process was found to beneficial in reducing oxidation and gas volume in the cracked surface region. An evacuation tube may be incorporated into the spray process of the Hyper Velocity Oxy-Fuel, if required.

The coating material to seal the crack prior to hot isostatic pressing, is chosen to match the superalloy substrate material or it can be deliberately made to be different, so as to have enhanced beneficial surface properties, or to allow easy removal of the coating after hot isostatic pressing. The choice of coating must be compatible with the superalloy part material. Generally, in the context of this invention, compatibility means some continuity or similarity of crystal structure, metallurgical structure, or both, between the superalloy article and the repair of the defect by diffusion healing from the coated material. Compatibility also implies that neither the superalloy material or the coating material adversely affects the other. The coating thickness is sufficient to be HIPed and seal the crack. Generally, the thickness is about 0.001 to 0.010 inches thick before HiPing. A preferred thickness is about 0.010 inches In accordance with this invention, after coating, the defective part is hot isostatic pressed at a suitable temperature, time, and pressure cycle to prevent recrystallization while effecting a diffusion bond at the crack surface. Following the hot isostatic pressing cycle, the coating may be removed if so designed.

Figure 2A:
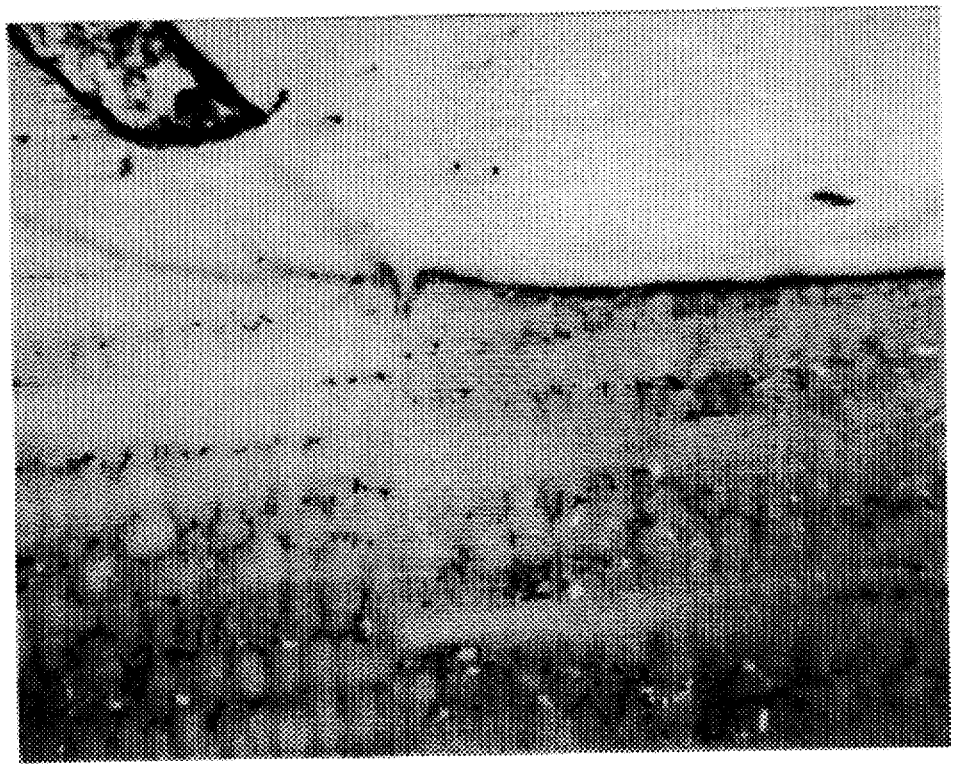
FIG. 2a is a photomicrograph at 50× magnification of a healed crack by the method of this invention.
Figure 2B:
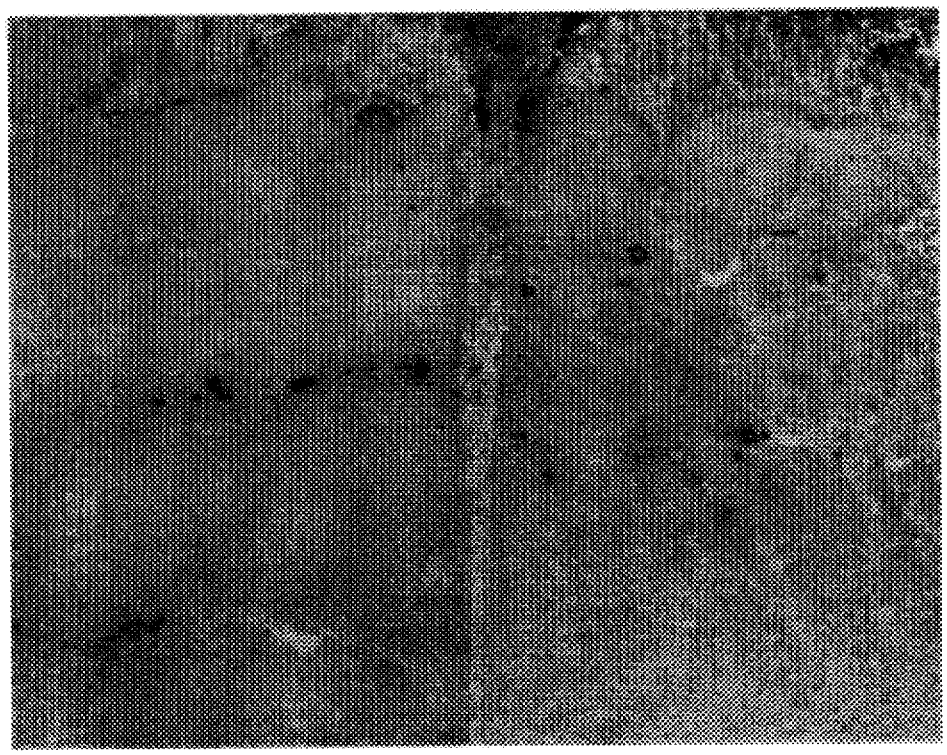
FIG. 2b shows the healed crack of FIG. 2a at 200× magnification.

FIGS. 2a and 2b show photomicrographs of a specimen that was coated and HIPed to seal outer surface cracks in superalloy parts. FIG. 2a shows the crack being sealed at the outer surface of the part at 50×. FIG. 2b demonstrates complete sealing (100% bonding) of the entire cracked area from the tip of the crack to the outermost surface of the superalloy part at 200×. This is the preferred sealing configuration and possible to achieve with sufficient cleaning.

It is further pointed out in this invention that a thermal treatment after the coating application can be beneficial to further reduce porosity in the coating and provide a leak tight structure. It will also be recognized by those skilled in the art of repair of superalloy parts, that after hot isostatic pressing the part member may still be in an unfinished form, and will, therefore, further require the use of material removal and surface finishing steps such as machining, polishing or other material removal to produce a finished part. The following examples further demonstrate, but do not limit the invention.

EXAMPLE 1

Spray coatings by HVOF of Rene 80 and pure nickel of about 0.010 inches thick were deposited on stainless steel and Rene N5 single crystal material. The substrate materials were welded together to simulate and form a crack to the exterior outermost surface. After the coating application, the coatings were found to be leak tight. The Rene N5 single crystal specimens that were coated by HVOF with pure nickel, were then hot isostatic pressed. The conditions for hot isostatic pressing were 1150° C. at 30 ksi for 3 hours. Metallography revealed that the crack was bonded 100% (FIGS. 2a and 2b).

EXAMPLE 2

Figure 3A:
FIG. 3A is a photomicrograph representing a surface crack before coating and hot isostatic pressing at 200×.
Figure 3B:
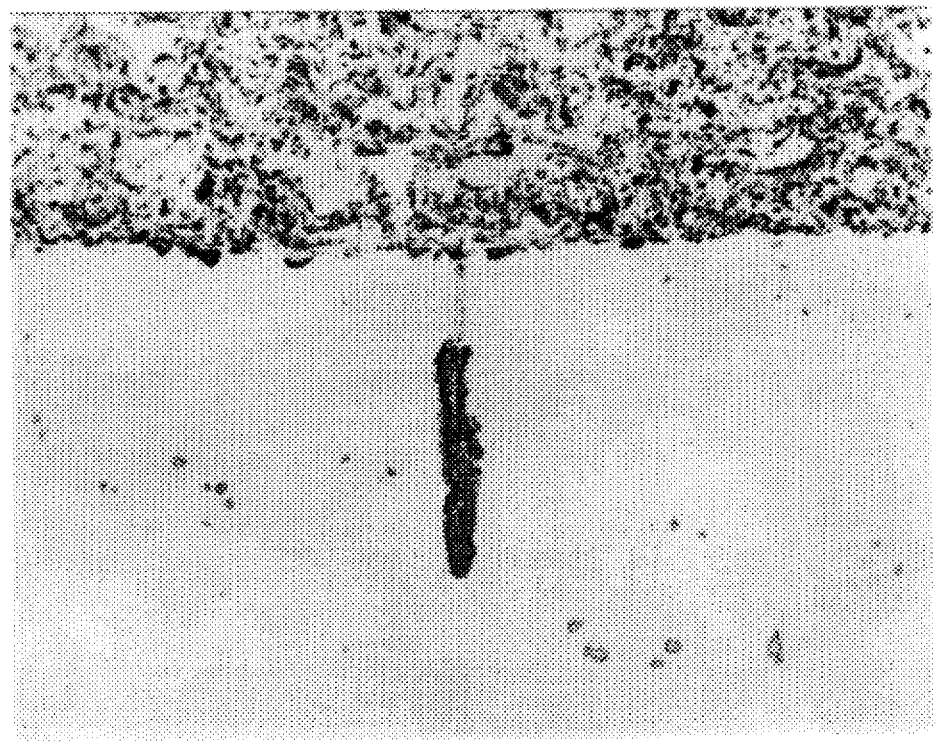
FIG. 3b is a photomicrograph of the representative crack of FIG. 3a after spray coating and hot isostatic pressing and shows the top closure of the crack at the part surface at 200×.

Cracked single crystal Rene N4 vane segments were successfully spray coated and hot isostatic pressed for repair. FIG. 3a shows a cracked Stage I CFM56-5A HPT nozzle segment. The cracked area was cleaned using fluoride ion cleaning. The cracked surface of the vanes were sectioned from the remainder of the part and the segment end walls. The cracked surface was Hyper Velocity Oxy-Fuel sprayed with a 0.012 inch thick coating of nickel chromium aluminum yttria (NiCrAlY). The spray coating segment was then vacuum heat treated at 1150° C. for about 2 hours and hot isostatic pressed at 1150° C., 30 ksi, for about 4 hours. The vacuum heat treatment served to densify the coating and increase its ductility. Leak test specimens revealed very small through-coating leaks in the HVOF coating which sealed during vacuum heat treat densification. It can be of further benefit in the fine through-coating porosity to seal the coating during vacuum heat treatment, which would then further improve the hot isostatic pressing bonding of the crack. The sealed crack at the outer surface is depicted in FIG. 3b. It is preferred that the entire crack seal. Generally, when only a outermost portion of the crack seals, it is attributed to insufficient cleaning or removal of contaminants from the crack. Table I gives the parameters used for HVOF spraying, the heat treatment, and HIPing the cracked specimen.

TABLE I

HIGH VELOCITY OXY-FUEL COATING

| | Seg. 1A | Seg. 1B |
| --- | --- | --- |
| Spray Process: | HVOF | HVOF |
| Powder: | NiCrAlY (−325/+400) | NiCrAly (−325/+400) |
| Powder Feed: | 2.4 rpm | 1.2 rpm |
| Gun Stand-off: | 10" | 10" |
| Gun Speed: | 1200"/min. | 1200"/min. |
| Oxygen Flow: | 480 scfh | 520 scfh |
| Propylene Flow: | 160 scfh | 120 scfh |
| Carrier Flow: | 55 scfh ($N^2$) | 55 scfh ($N^2$) |
| Thickness: | .010" | .012" |
| Post-Spray HT: | 1150 C./2 hr/vac | 1150 C./2 hr/vac |
| HIP Parameters: | 1150 C./4 hr/30 ksi | 1150 C./4 hr/30 ksi |
| | Temperature First | Temperature First |

EXAMPLE 3

Air plasma spray trials were conducted on a Rene N5 disk that was sliced and then welded back together to create a crack specimen. A quarter inch diameter stainless steel tube was welded in the middle of one face of the disk for leak testing. The crack specimen was grit blasted and then ultrasonically cleaned in acetone. A nominal 0.010 inch thick layer of nickel chromium aluminum yttria was air plasma sprayed over the cracked face of the specimen. The spray parameters shown in Table II were used.

TABLE II

AIR PLASMA SPRAY COATING

| Powder: | NiCrAlY (−140/+325) | Feed Rate: | ≧3 lbs./hr. |
|---|---|---|---|
| Gun Type: | Metco 7MB | Voltage: | 75 volts |
| Anode: | G | Amperage: | 600 amps |
| Cathode: | 7M63 | Primary Gas: | $N_2$ @ 34 psi* |
| Substrate Speed: | 40 rpm | Carrier Gas: | $N_2$ @ 32 psi* |
| Gun Stand-Off: | 2" | Aux. Gas: | $H_2$ @ 50 psi* |
| Gun Speed: | 7 in./min. | | |

*flow rate determined by critical orifice on Miller control unit.

After spray coating, the crack volume was pressurized to 10 psi by connecting the quarter inch tube to a regulated cylinder of nitrogen. A soap solution applied to the outer surface of the spray coating indicated, by vigorous bubbling in the area of the crack that the coating was porous through its thickness. The coat specimen was then vacuum heat treated at 1150° C. for two hours in an attempt to densify the coating to effect a leak tight seal over the crack. Again, leak testing indicate large amount of through-thickness porosity. The coating was then hot isostatic pressed at 1150° C., 30 ksi, for about 4 hours. It was again leak tested after hot isostatic pressing and the cracked area still showed signs of leaking.

Another crack specimen was made as stated above, only this time a 0.020 inch thick nickel chromium aluminum yttrium (NiCrAlY) coating was applied by the air plasma spray process. The coated specimen was leak tested as-sprayed, and after vacuum heat treating for two hours at 1150° C. It leaked in both cases. It was concluded that air plasma spray may not be a suitable process for coating the cracked surfaces.

While the methods disclosed herein constitute preferred methods of the invention, it is to be understood that the invention is not limited to these precise methods, and that changes may be made therein without departing from the scope of the invention which is defined in the appended claims.

What is claimed is:

1. A method for repairing cracks on the outermost surface of an article, comprising the steps of:

selecting an article having a directionally oriented microstructure and a superalloy composition, whereby said article has at least one crack on its outermost surface, said crack having an opening to the atmosphere;

cleaning said crack surface to sufficiently remove contaminants;

coating the cleaned crack surface with a material compatible with a composition of said article; and hot isostatic pressing the coated crack surface at a temperature, pressure, and time sufficient to repair the crack surface while maintaining the crystalline structure and mechanical properties of the article.

2. A method according to claim 1 where the article is a blading member.

3. A method according to claim 2 where the blading member is a turbine blade, bucket, vane, nozzle, turbine shroud, or combustor shingle.

4. A method according to claim 1 where the superalloy is selected from the group consisting of nickel-base alloys, iron-base alloys, cobalt-base alloys, niobium-base alloys, titanium-base alloys, and mixtures thereof.

5. A method according to claim 4 where the directionally oriented microstructure of the superalloy is directionally solidified polycrystalline or single crystal.

6. A method according to claim 5 where the crystals of the superalloy have a crystallographic direction parallel to a length of the article comprising a plurality of elongated grains and single crystals.

7. A method according to claim 1 where the article has a bond coat and a thermal barrier coating on the outermost surface.

8. A method according to claim 1 where the coating is applied by Hyper Velocity Oxy-Fuel spray process.

9. A method according to claim 1 where the coating material is MCrAlY, where M is iron, nickel, cobalt, or mixtures thereof.

10. A method according to claim 1 where the coating thickness is about 0.001 to 0.010 inches.

11. A method according to claim 1 where after the coating step, the article is vacuum heat treated for a period of time to seal or densify the coating.

12. A method according to claim 11 where the vacuum heat treatment is between about 1000° C. to 1200° C. for about 30 minutes to about 150 minutes.

* * * * *